June 16, 1953 J. M. BARR 2,642,090
DIAPHRAGM ASSEMBLY AND METHOD OF MAKING SAME
Filed Nov. 16, 1946
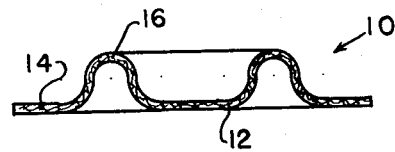
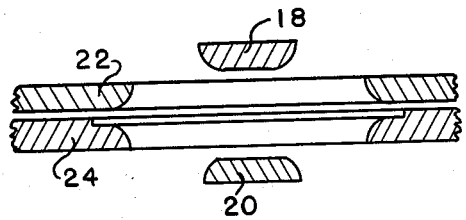
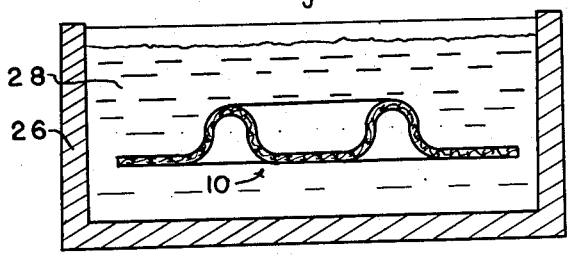
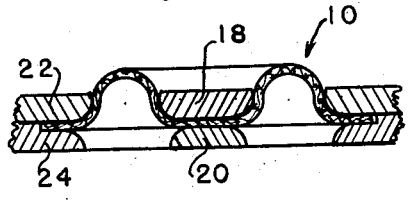
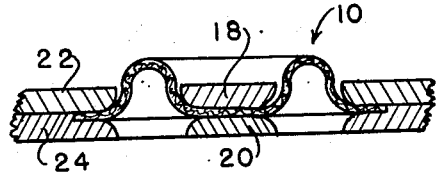
INVENTOR.
John M. Barr
BY *Lester W Clark*
AGENT Patented June 16, 1953

2,642,090

UNITED STATES PATENT OFFICE 2,642,090

DIAPHRAGM ASSEMBLY AND METHOD OF MAKING SAME

John M. Barr, West Hartford, Conn., assignor, by mesne assignments, to Niles-Bement-Pond Company, West Hartford, Conn., a corporation of New Jersey Application November 16, 1946, Serial No. 710,346

12 Claims. (Cl. 137—791)

The present invention relates to methods of forming pressure responsive diaphragm structures, and particularly to forming such structures which are intended to be used in contact with a liquid and also to the diaphragm assembly produced by the method.

Diaphragm structures of the type to which my invention relates generally consist of a flat central circular portion and a flat annular peripheral portion, separated by a deep convolution. It is common to provide rigid reinforcing members for the opposite sides of the flat portions of the diaphragm. These rigid members are attached to the diaphragm by bonding, clamping, or any other suitable method. The diaphragm itself is usually formed of a suitable base, usually fabric, impregnated with rubber or some similar material, although the fabric is sometimes omitted and rubber alone used. Where the word rubber is used in this specification and claims, it is intended to be generic to rubber and all other similar materials.

It is customary, in assemblying these diaphragm structures, to attach the rigid reinforcing members to the diaphragm when it is in a dry condition. When the diaphragm is placed in use, in contact with a liquid, the liquid may cause distortion of the convolution. This has been found to be especially true where the liquid is one of the hydrocarbons, such as are commonly used as fuels for internal combustion engines. It has been found that such fuels cause the rubber in the diaphragm to swell, thereby changing the diaphragm shape. Some fuels actually leach out part of the plasticizer in the rubber. In such cases the fuel acts as a plasticizer as long as it remains in contact with the rubber. This change in plasticizers results in a general swelling and distorting of the rubber. If such a diaphragm is allowed to dry, it becomes somewhat stiff, and must be soaked in fuel before being placed in service again. In some cases, the fibers of the fabric may also be distorted when they are in contact with the fuel. Since the flat portions of the diaphragm are rigidly clamped in place and cannot move, while the diaphragm convolution is relatively free to change its shape, stresses are set up in the diaphragm because of its distortion.

It is an object of the present invention to provide a method of forming diaphragms for use in contact with liquid, which will prevent stressing of the diaphragm when placed in service because of distortion due to the action of the liquid on the diaphragm.

Another object of the present invention is to provide an improved method of assembling a fabric diaphragm with rigid reinforcing members.

Other objects and advantages of the present invention will become apparent from a consideration of the appended specification, claims and drawings, in which Figure 1 represents a cross-sectional view of a fabric diaphragm to be assembled in accordance with my invention, Figure 2 is a cross-sectional view of a set of reinforcing members to be assembled with the diaphragm of Figure 1 in accordance with my invention, Figure 3 illustrates the soaking of the diaphragm of Figure 1 in the liquid which it is to contact in service, this soaking being an essential step in my invention, Figure 4 shows the soaked diaphragm assembled with the reinforcing members of Figure 2, and Figure 5 shows the assembled diaphragm and reinforcing members after the diaphragm has dried.

Referring to the drawings, there is shown in Figure 1 a diaphragm, generally indicated at 10, which may be used in the practice of my invention. The diaphragm 10 consists of a central circular portion 12, a peripheral annular portion 14, separated by a convolution 16. The diaphragm 10 is usually formed of fabric suitably impregnated with rubber or some similar material. The convolution may be formed in the rubberized fabric according to any of several well-known processes.

Figure 2 illustrates a pair of reinforcing members 18 and 20, which are adapted to be placed on opposite sides of the central circular portion 12 of the diaphragm 10 of Figure 1 and a pair of annular reinforcing members 22 and 24, which are adapted to be placed on opposite sides of the annular portion 14 of the diaphragm 10.

In accordance with my invention, before assembling the diaphragm 10 with the reinforcing members, I first soak the diaphragm in the liquid which it is to contact when placed in service. This step in the assembly process is illustrated in Figure 3, wherein the diaphragm 10 is placed in a tank 26 filled with a liquid 28 deep enough to completely cover the diaphragm 10.

After the diaphragm has soaked in the liquid long enough to absorb the liquid and swell to the shape it will assume in use, the diaphragm is removed from the liquid and assembled with the reinforcing plates, as illustrated in Figure 4. This assembly takes place while the diaphragm is still substantially saturated with the liquid, although it is permissible to allow the surface to dry before assembly.

Figure 5 illustrates the form which the convolution of the diaphragm may assume if it is allowed to dry after being assembled, as illustrated in Figure 4. It should be noted that the sides of the convolution in Figure 5 are separated from the reinforcing plates. It does no harm to store or ship the dry diaphragm assembly with the convolution separated from the reinforcing plates. The convolution also may appear, at this time, to be rough and distorted. This, too, will not affect the operation of the diaphragm. When the diaphragm is finally placed in service and again in contact with the liquid in which it was soaked, it will again assume the shape it had in Figure 4 and it will again fit the reinforcing members.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. A pressure responsive diaphragm assembly for use in contact with a liquid fuel for internal combustion engines, comprising a thin, highly flexible rubber-impregnated fabric diaphragm preformed with a relatively deep convolution and soaked in the liquid which it is to contact in use and allowed to swell and otherwise assume the contour it will have in use, a pair of rigid reinforcing discs attached to the opposite sides of a central circular portion of said diaphragm, and a pair of rigid reinforcing annular members attached to a peripheral annular portion of said diaphragm spaced from said central portion while said diaphragm is still substantially saturated with said liquid, so that said diaphragm will not be stressed when placed in service by deformation thereof due to wetting with said liquid.

2. The method of constructing a flexible diaphragm assembly, for use in contact with a liquid fuel for internal combustion engines, comprising the steps of soaking in said liquid a thin, highly flexible, preformed, rubber-containing diaphragm consisting of a flat, central, circular portion and a flat, annular peripheral portion, joined by a deep convolution, clamping each of said flat portions of said diaphragm between spaced, rigid reinforcing members while it is still substantially saturated with said liquid, and drying said assembly of diaphragm and reinforcing members, so that said diaphragm will not be stressed when placed in service by deformation thereof due to wetting with said liquid.

3. The method of constructing a flexible diaphragm assembly, for use in contact with a liquid fuel for internal combustion engines, comprising the steps of soaking in said liquid a thin, highly flexible, preformed diaphragm consisting partly of rubber and having a flat, central, circular portion and a flat, annular peripheral portion, joined by a deep convolution, clamping a pair of spaced, rigid members to each of said flat portions of said diaphragm while it is still substantially saturated with said liquid, and drying said assembly of diaphragm and rigid members, so that said diaphragm will not be stressed when placed in service by deformation thereof due to wetting with said liquid.

4. The method of constructing a flexible diaphragm assembly, for use in contact with a liquid fuel for internal combustion engines, comprising the steps of soaking in said liquid a thin, highly flexible, rubber-containing diaphragm having a flat, central, circular portion and a flat, annular peripheral portion, joined by a deep convolution, clamping to each of said flat portions of said diaphragm a pair of rigid reinforcing members on opposite sides of said diaphragm while said diaphragm is still wet with said liquid, and drying said assembly of diaphragm and reinforcing members, so that said diaphragm will not be stressed when placed in service by deformation thereof due to wetting with said liquid.

5. The method of constructing a flexible, pressure-responsive diaphragm assembly, for use in contact with a liquid fuel for internal combustion engines, comprising the steps of soaking in said liquid a thin, highly flexible, rubber-impregnated fabric diaphragm, having a flat, central, circular portion and a flat, annular peripheral portion, joined by a deep convolution, allowing said diaphragm to swell and otherwise assume the contour it will have in use, clamping a pair of rigid reinforcing discs to the opposite sides of said central portion of said diaphragm and a pair of rigid reinforcing annular members to the entire peripheral annular portion of said diaphragm spaced from said central portion by said convolution, while said diaphragm is still substantially saturated with said liquid, and drying said assembly of diaphragm and reinforcing members, so that said diaphragm will not be stressed when placed in service by deformation thereof due to wetting with said liquid.

6. The method of constructing a flexible diaphragm assembly, for use in contact with a liquid fuel for internal combustion engines, comprising the steps of soaking in said liquid a thin, highly flexible, rubber-containing diaphragm having a flat, central circular portion and a flat, annular peripheral portion, joined by a deep convolution, clamping at least one rigid reinforcing member to each of said flat portions of said diaphragm while it is still substantially saturated with said liquid, and drying said assembly of diaphragm and reinforcing members, so that said diaphragm will not be stressed when placed in service by deformation thereof due to wetting with said liquid.

7. The method of constructing a flexible, pressure-responsive diaphragm assembly, for use in contact with a liquid fuel for internal combustion engines, comprising the steps of soaking in said liquid a thin, highly flexible, rubber-impregnated fabric diaphragm having a flat, central, circular portion and a flat, annular peripheral portion, joined by a deep convolution, allowing said diaphragm to swell and otherwise assume the contour it will have in use, and clamping at least one rigid reinforcing member to each of said flat portions of said diaphragm while it is still substantially saturated with said liquid, and drying said assembly of diaphragm and reinforcing members, so that said diaphragm will not be stressed when placed in service by deformation thereof due to wetting with said liquid.

8. A flexible diaphragm assembly, for use in contact with a liquid fuel for internal combustion engines, comprising a pair of spaced rigid members connected by a thin, highly flexible, rubber-containing diaphragm having a flat, central circular portion and a flat, annular peripheral portion joined by a preformed, relatively deep convolution, said diaphragm being first soaked in the liquid which it is to contact in use, then clamped at both of its said flat portions between said reinforcing members while still substantially saturated with said liquid, and dried in assembled condition, so that said diaphragm will not be stressed when placed in service by deformation thereof due to wetting with said liquid.

9. A diaphragm assembly, for use in contact with a liquid fuel for internal combustion engines, comprising a pair of spaced rigid members and a thin, highly flexible member, consisting of at least partly of rubber, connecting said rigid members, said flexible member consisting of a thin diaphragm having a flat, central circular portion and a flat annular peripheral portion joined by a preformed, relatively deep convolution, said diaphragm being first soaked in said liquid, and then having each of its said flat portions clamped to one of said rigid members while said diaphragm is still substantially saturated with said liquid, and dried in assembled condition, so that said diaphragm will not be stressed when placed in service by deformation thereof due to wetting with said liquid.

10. A diaphragm assembly, for use in contact with a liquid fuel for internal combustion engines, comprising a pair of spaced rigid reinforcing members connected by a thin, highly flexible rubber-containing diaphragm having a flat, central circular portion and a flat annular peripheral portion joined by a preformed, relatively deep convolution, said diaphragm being first soaked in said liquid and then clamped at each of its said flat portions to one of spaced rigid reinforcing members on opposite sides of said convolutions while said diaphragm is still wet with said liquid, and dried in assembled condition, so that said diaphragm will not be stressed when placed in service by deformation thereof due to wetting with said liquid.

11. A diaphragm assembly, for use in contact with a liquid fuel for internal combustion engines, comprising a plurality of spaced, rigid reinforcing members connected by a thin, highly flexible rubber-containing diaphragm having a flat, central circular portion and a flat annular peripheral portion joined by a preformed, relatively deep convolution, said diaphragm being first soaked in said liquid, then attached to said rigid members, by clamping each of said flat portions to one rigid reinforcing member, while said diaphragm is still substantially saturated with said liquid, and dried in assembled condition, so that said diaphragm will not be stressed when placed in service by deformation thereof due to wetting with said liquid.

12. A pressure-responsive diaphragm assembly, for use in contact with a liquid fuel for internal combustion engines, comprising a pair of spaced, rigid reinforcing members connected by a thin, highly flexible, rubber-impregnated fabric diaphragm having a flat, central circular portion and a flat annular peripheral portion joined by a preformed, relatively deep convolution, said diaphragm being first soaked in said liquid and allowed to swell and otherwise assume the contour it will have in use, then having each of its said flat portions clamped to one rigid reinforcing member while it is still substantially saturated with said liquid, and dried in assembled position, so that said diaphragm will not be stressed when placed in service by deformation due to wetting.

JOHN M. BARR.

References Cited in the file of this patent

UNITED STATES PATENTS

| Number | Name | Date |
|---|---|---|
| 1,851,553 | Walker | Mar. 29, 1932 |
| 2,129,289 | Soll | Sept. 6, 1938 |
| 2,170,919 | Thener | Aug. 29, 1939 |
| 2,250,674 | McBurney | July 29, 1941 |
| 2,293,266 | Mitchell | Aug. 18, 1942 |